Patented Sept. 16, 1924.

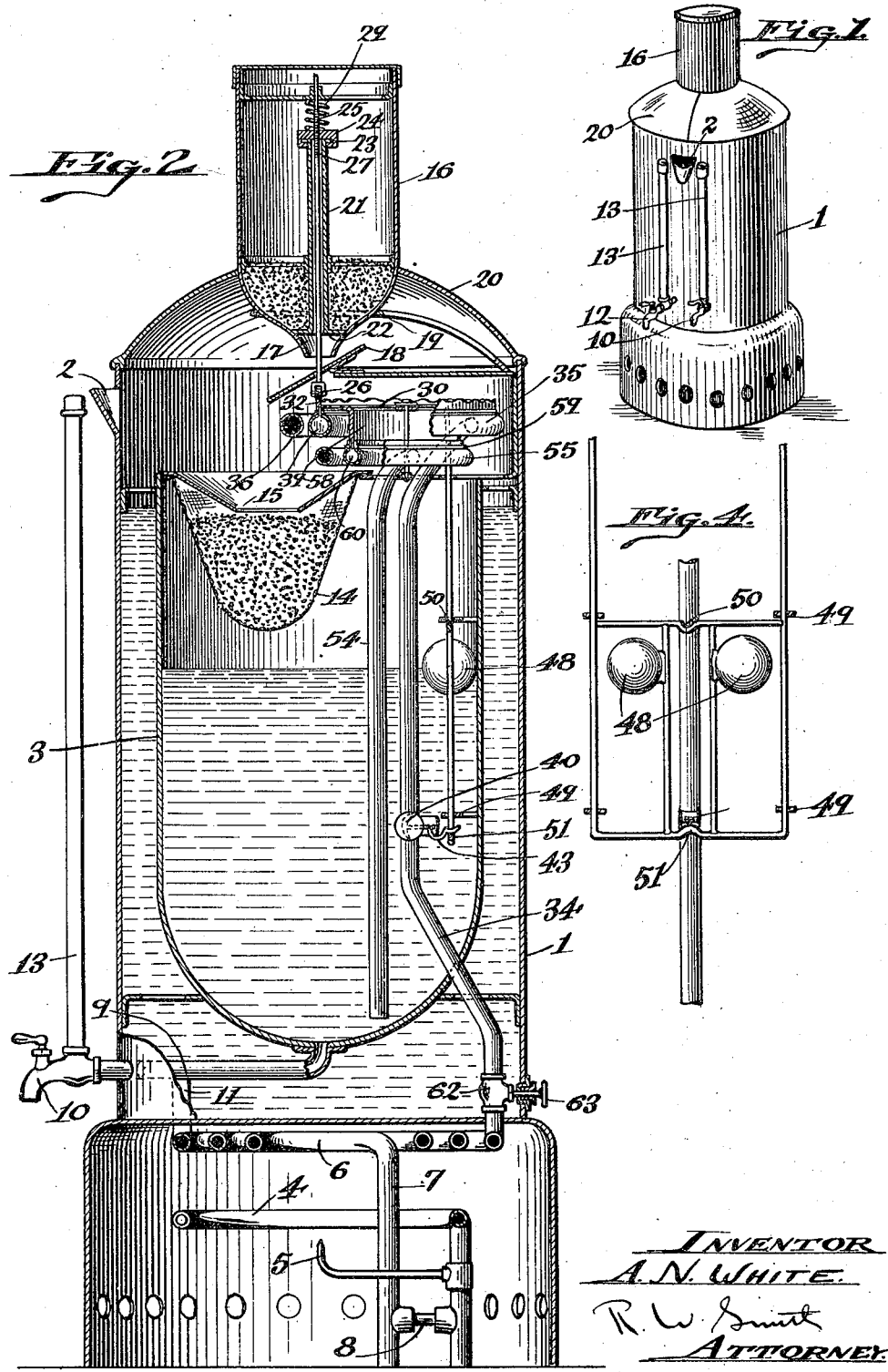

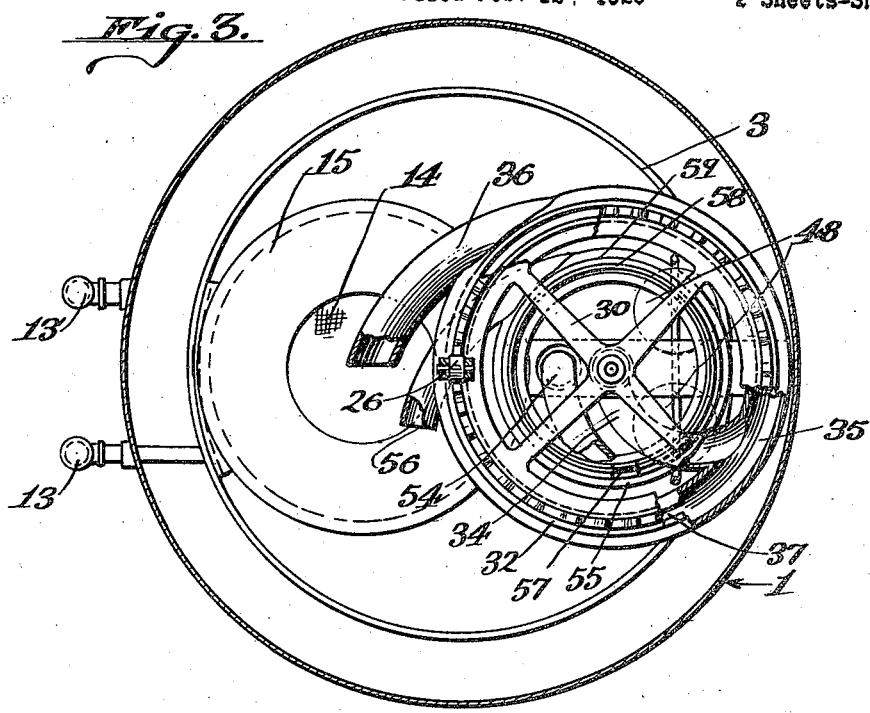
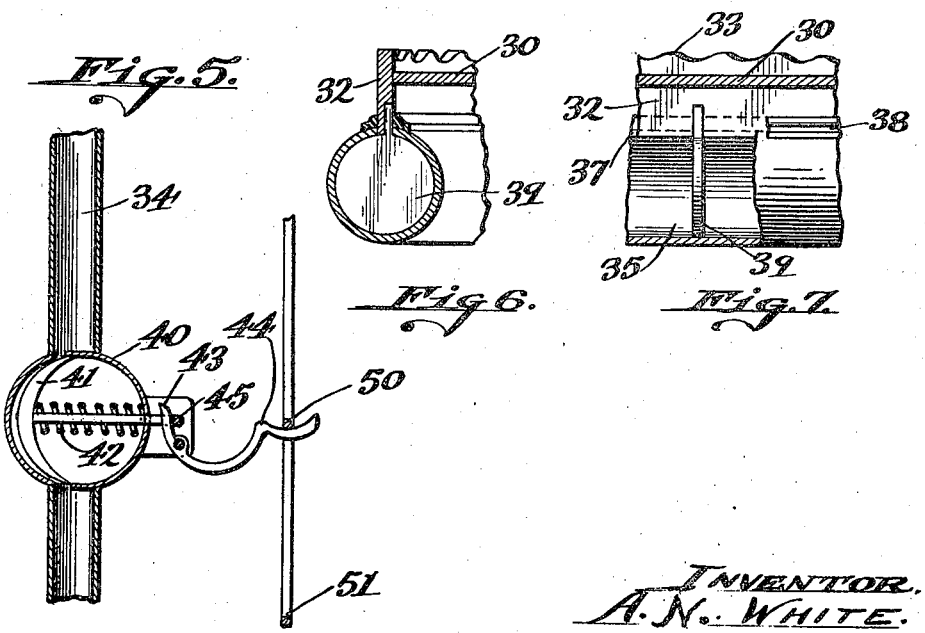

1,508,809

UNITED STATES PATENT OFFICE.

ALFRED N. WHITE, OF LOS ANGELES, CALIFORNIA.

COFFEE PERCOLATOR.

Application filed February 12, 1923. Serial No. 618,464.

*To all whom it may concern:*

Be it known that I, ALFRED N. WHITE, a citizen of the United States, residing at Los Angeles, county of Los Angeles, State of California, have invented new and useful Improvements in Coffee Percolators, of which the following is a specification.

It is the object of this invention to provide a coffee percolator in which dry coffee is automatically supplied to the coffee bag, in a quantity determined by the amount of water percolating through the bag, the supply of water being governed by the supply of percolated coffee in the apparatus.

By this arrangement as coffee is withdrawn from the percolator, the dry coffee and the water are automatically replenished in the correct proportion to make the coffee, and maintain a constant supply thereof.

It is a further object of the invention to provide a pumping means operated by the flow of water to the coffee bag, and adapted to repour the percolated coffee through the coffee grounds.

The invention will be readily understood from the following description of the accompanying drawings, in which:

Fig. 1 is a perspective view of a percolator constructed in accordance with the invention.

Fig. 2 is a vertical section through the percolator.

Fig. 3 is a top plan view with the cover and the coffee hopper removed.

Fig. 4 is a detail elevation of the float mechanism.

Fig. 5 is a vertical section through the valve for the water pipe.

Fig. 6 is a transverse section through the water coil.

Fig. 7 is a fragmentary side elevation of the same partly broken away.

The percolator comprises an outer shell 1, forming a water chamber supplied through funnel 2, and adapted to receive a percolating receptacle which may be a usual jar 3.

A heating means shown as a gas burner 4 having pilot light 5, is positioned below shell 1, and a coil 6 for heating water, is positioned above the burner and below the shell, the coil being supplied with water under pressure through a pipe 7 connected to a suitable main. A thermostatic valve 8 regulates the flow of gas to the burner in accordance with the temperature of the water in pipe 7.

A coffee conduit 9 extends from the base of jar 3 through the shell 1 and terminates in a faucet 10, and a pipe 11 for supplying hot water extends from coil 6 through shell 1 and terminates in a faucet 12. A usual gauge glass 13 is connected to faucet 10, and a gauge glass 13' communicates with water chamber 1.

A coffee bag 14 is removably supported over the top of jar 3, and a hopper for dry coffee is adapted to discharge into said coffee bag, an annular guard 15 being received in the upper portion of the coffee bag for preventing splashing, and providing for passage of dry coffee and water through the central opening in the guard.

The hopper for dry coffee is shown as a glass jar 16 having a tapering discharge opening 17 at the base thereof and above the coffee bag. An inclined baffle 18 is positioned beneath the discharge opening, so as to receive the coffee from jar 16 and direct the same into the coffee bag. The jar 16 is supported in a bracket 19 carried by shell 1, and the cover 20 for the percolator, is a split construction adapted to be received around the lower portion of jar 16.

A valvular control is provided for discharge opening 17, and comprises a tube 21 in hopper 16, having a valve disc 22 at its lower end, and a flange 23 at its upper end, with a nut 24 received on said tube and engaging the flange 23. A rod 25 extends through the tube, and depends therefrom through an opening in baffle 18, said rod having a roller 26 at its lower end. The nut 24 is threaded onto the upper end of the rod as shown at 27.

The rod and tube are supported in jar 16 by brackets 28, and a spring 29 between one of said brackets and the nut 24, is adapted to normally depress the tube and rod, so that valve disc 22 closes the discharge opening 17.

A spider 30 is journaled in a bracket 31 below hopper 16 and baffle 18, and above jar 3 and the coffee bag, the parts being so arranged that the periphery of the spider is in vertical alinement with roller 26.

A vertical flange 32 is provided at the periphery of spider 30, the upper edge of said flange forming a plurality of circumferentially spaced cams 33 adapted to successively engage roller 26 upon rotation of the spider, so as to elevate the rod 25 and tube 21 against the tension of spring 29, and thereby alternately open and close valve 22. The degree of opening movement of the valve may be adjusted by turning nut 24, in order to regulate the discharge of coffee, as controlled by the rotation of the spider.

Spider 30 is rotated by the flow of hot water from coil 6 to the coffee bag. As an instance of this arrangement, a pipe 34 extends upwardly from coil 6 through jar 3 and outside of the coffee bag, the upper end of said pipe communicating tangentially with a coil 35 which is concentric with, and positioned below spider 30. A pipe 36 leads from the opposite side of coil 35 and opens into the coffee bag alongside of the coffee discharge formed by baffle 18. It will thus be seen that water from pipe 34 will circulate through coil 35 in one direction, and will then be discharged into the coffee bag through pipe 36.

The top of coil 35 is provided with an annular slot 37, and the lower edge of flange 32 extends into said slot, with a strip 38 received on said flange and resting upon the coil. A plurality of impingement elements 39 are fixed upon the flange within the coil, for contact of the water against the impingement elements, as the water circulates through the coil. It will thus be seen that the flow of water will rotate spider 30 and alternately open and close valve 22, for discharge of a quantity of dry coffee onto baffle 18 and thence into bag 14, said discharge of coffee being proportional to the amount of water supplied to the coffee bag.

The flow of water through coil 35 and into the coffee bag is controlled by the amount of percolated coffee in jar 3, so that when the coffee in said jar has been withdrawn to a predetermined low level, additional water and the required amount of dry coffee will be discharged into the coffee bag, for making additional coffee and maintaining the supply in jar 3.

As in instance of this arrangement, a valve casing 40 is provided in pipe 34, and a valve 41 normally closed by a spring 42, is mounted in said valve casing. A cam 43, upon one end of a lever 44, is adapted to engage a stud 45 upon the stem of valve 41, when the opposite end of the lever is swung downwardly, in order to open the valve against the action of its spring. The cam is arranged so as to maintain the valve in open position, until the lever is swung in the opposite direction, said opposite swinging of the lever disengaging the cam from stud 45 and permitting the spring 42 to return the valve and maintain the same in closed position.

The movement of lever 44 as thus described, is controlled by a float mechanism mounted in jar 3. The float mechanism comprises spaced spherical floats 48 fixed in a frame which is guided in its vertical movement by arms 49 carried by jar 3.

The frame for the floats include cross bars 50 and 51 in vertically spaced relation above and below the operating end of lever 44, and in alinement with said lever end. It will thus be seen that withdrawal of coffee from jar 3 will lower the float mechanism, and at a predetermined low level, rod 50 will abut against the end of lever 44, so as to swing the latter downwardly and thereby open valve 41, and thus permit water to flow through pipe 34.

The coffee supply in jar 3 will thus be replenished as previously described, and the float mechanism rising with the coffee level will cause rod 51 to abut against the lever 44 when a predetermined capacity is reached, in order to swing the lever upwardly and thereby permit the valve 41 to close and shut off the flow of water through pipe 34.

By the construction thus far described, hot water will percolate once through the coffee in bag 14, but means are also provided for repouring the percolated coffee through the coffee grounds.

For this purpose a pipe 54 is mounted in jar 3 and is open at its lower end to the percolated coffee in said jar. The pipe extends upwardly and communicates tangentially with a coil 55 concentrically positioned beneath coil 35. A pipe 56 leads from the opposite side of coil 55 and opens into the coffee bag 14.

The top of coil 55 is provided with an annular slot 57, and a vertical annular flange 58 carried by spider 30, extends into said slot, with a strip 59 received on said flange and resting on the coil. A plurality of pistons 60 are fixed upon the flange within the coil, so that when spider 30 is rotated as previously described, said pistons will rotate in coil 55 and thereby draw percolated coffee through pipe 54 and coil 55, for discharge through pipe 56 into the coffee bag.

It will thus be seen that the percolated coffee is automatically repoured during operation of the coffee making mechanism; the said mechanism automatically maintaining a desired quantity of coffee in the jar 3, with the dry coffee and hot water for making the coffee automatically supplied in the desired proportion, which may be regulated by adjusting the nut 24.

In order to regulate the flow of water through coil 6 and pipe 34, so as to insure proper heating of all of the water, a flow regulating valve 62 is preferably positioned in pipe 34 below valve 41, said valve having a manually operated adjusting means 63.

It will be apparent that various changes may be made in the construction, combination, and arrangement of parts as thus described, without departing from the spirit of the invention.

What is claimed is:

1. A percolator having a container adapted for percolation of liquid therethrough, means for supplying a liquid, means for discharging material into said container, and means for controlling said discharge in proportion to the liquid supply.

2. A percolator having a container adapted for percolation of liquid therethrough, means for supplying a liquid, a receptacle for the percolated liquid, and means for controlling said liquid supply in proportion to the supply of percolated liquid in said receptacle.

3. A percolator having a container adapted for percolation of liquid therethrough, means for supplying a liquid, and means for repouring percolated liquid through said container, said repour mechanism being operated by said liquid supply.

4. A percolator having a container adapted for percolation of liquid therethrough, means for supplying a liquid, a receptacle for the percolated liquid, means for controlling said liquid supply in accordance with the supply of percolated liquid in said receptacle, and means for repouring percolated liquid from said receptacle through said container, said repour mechanism being operated by said liquid supply.

5. A percolator having a container adapted for percolation of liquid therethrough, means for supplying a liquid, a receptacle for the percolated liquid, and means for controlling said liquid supply and for controlling the discharge of material into said container, in proportion to the supply of percolated liquid in said receptacle.

6. A percolator having a container adapted for percolation of liquid therethrough, means for supplying a liquid, a receptacle for the percolated liquid, a conduit discharging into said container and communicating with said receptacle, and means for controlling the liquid supply and for controlling the discharge of material into said container, in accordance with the supply of percolated liquid in said receptacle.

7. A percolator having a container adapted for percolation of liquid therethrough, a hopper for material adapted to be discharged into said container, a valve adapted to open and close direct communication between said hopper and said container, means for adjusting the range of opening movement of said valve, and means for operating said valve.

8. A percolator having a container adapted for percolation of liquid therethrough, means for discharging material into said container, a valvular control for said discharge, an annulus for passage of liquid therethrough and discharge of said liquid into said container, and a rotatable member having an impingement element in said annulus for rotation of said member by the flow of liquid through said annulus, said rotatable member having means adapted to engage said valvular control for operating the same during rotation of said member.

9. A percolator having a container adapted for percolation of liquid therethrough, means for supplying a liquid, a receptacle for the percolated liquid, a valve controlling said liquid supply, operating means for said valve adapted to retain the same in open or closed position, and a float in the receptacle for the percolated fluid adapted to actuate said operating means to open the valve when the percolated fluid reaches a predetermined low level, said float being adapted to actuate said operating means so as to close the valve when the percolated fluid reaches a predetermined high level.

10. A percolator having a container adapted for percolation of liquid therethrough, means for supplying a liquid, means for discharging material into said container, means for controlling said discharge in proportion to the liquid supply, and means for adjusting said controlled discharge.

11. A percolator having a container adapted for percolation of liquid therethrough, an annulus for passage of liquid therethrough and discharge of said liquid into said container, a rotatable member having an impingement element in said annulus for rotation of said member by the flow of liquid through said annulus, a conduit communicating with the percolated liquid and discharging into said container, an annulus in said conduit, and a pump element carried by said rotatable member and movable in said annulus for drawing percolated liquid through said conduit.

12. A percolator including a container adapted for percolation of liquid therethrough and having an open top and a guard received in said open top adjacent the rim thereof and forming a central opening for discharge into said container, said container being adapted to receive a dry material and adapted for discharge of a liquid into the same through said central opening for percolation of said liquid through said dry material, the said guard preventing splashing of said liquid from said container.

13. A percolator having a container adapted for percolation of liquid therethrough, means for supplying a liquid, means for controlling discharge of material into said container in proportion to the liquid supply, and means for repouring percolated liquid through said container, said repour mechanism being operated by said liquid supply.

14. A percolator having a fluid supply and means operated by said fluid supply for controlling discharge of material into said percolator.

15. A percolator having a container adapted for percolation of liquid therethrough, a conduit for a liquid discharging into said container, a piston in said conduit actuated by flow of liquid therethrough, and means actuated by said piston for controlling the discharge of material into said container.

16. A percolator having a container adapted for percolation of liquid therethrough, a conduit for a liquid discharging into said container, and a pump adapted to repour the percolated liquid through said container, said pump being operated by the flow of liquid through said conduit.

17. A percolator having a container adapted for percolation of liquid therethrough, means for supplying a liquid, a receptacle for the percolated liquid, and a float in said receptacle controlling said liquid supply.

18. A percolator having a container adapted for percolation of liquid therethrough, a piston, a liquid supply operating said piston and discharging into said container, means actuated by said piston for controlling the discharge of material into said container, and a pump adapted to repour the percolated liquid through said container, said pump being operated by said piston.

19. A percolator having a container adapted for percolation of liquid therethrough, a conduit for a liquid discharging into said container, a piston in said conduit actuated by the flow of liquid therethrough, means actuated by said piston for controlling the discharge of material into said container, a receptacle for the percolated liquid, a pump adapted to repour percolated liquid from said receptacle into said container, said pump being operated by said piston, and a float in said receptacle controlling said liquid supply.

20. A percolator having a container adapted for percolation of liquid therethrough, a receptacle for the percolated liquid, a conduit for a liquid connected to a source of supply distinct from said receptacle and discharging into said container, and a heating means adapted to heat both said conduit and said receptacle.

21. A percolator having a container adapted for percolation of a liquid therethrough, a conduit for a liquid supply discharging into said container, a receptacle for the percolated liquid, means for controlling said liquid supply in proportion to the supply of percolated liquid in said receptacle, means for heating said conduit, and means for controlling said heating means by said liquid supply.

22. The combination of a receptacle for a liquid, a conduit for said liquid communicating with said receptacle, a normally closed valve in said conduit, an operating member connected thereto for opening said valve, and a float in said receptacle normally disengaged from said operating member and adapted to engage the same at a predetermined low liquid level in said receptacle for actuating said operating member and opening said valve.

In testimony whereof I have signed my name to this specification.

ALFRED N. WHITE.